May 28, 1957
E. O. S. HÄLL
2,793,667
VERTICAL AXIS ROTARY SLICER
Filed March 5, 1952
2 Sheets-Sheet 1
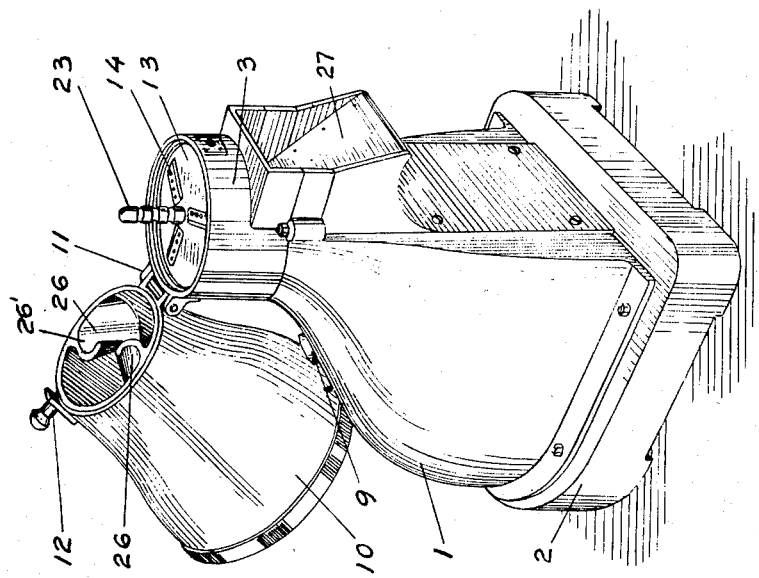
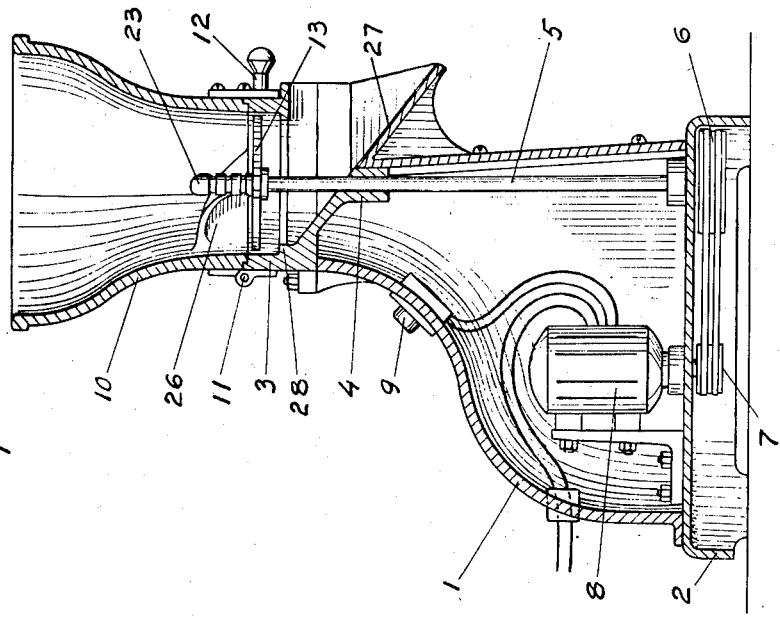
Inventor
Ernst Otto Sigfrid Häll
by Sommers & Young
Attorneys

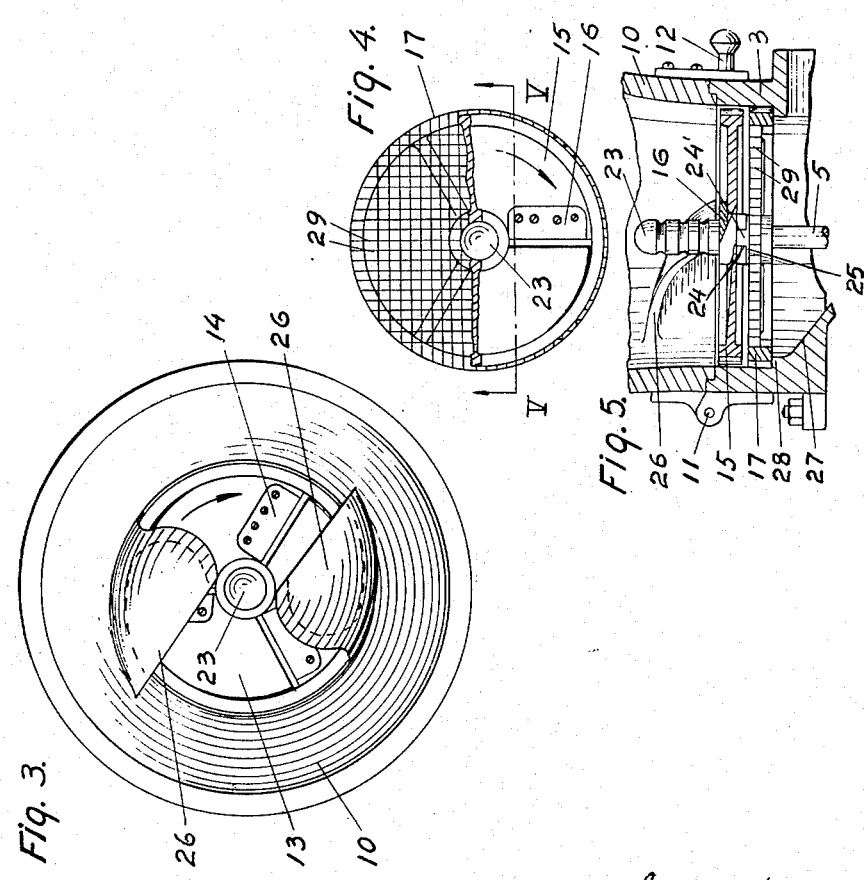

United States Patent Office 2,793,667
Patented May 28, 1957

2,793,667

VERTICAL AXIS ROTARY SLICER

Ernst Otto Sigfrid Häll, Stockholm, Sweden

Application March 5, 1952, Serial No. 274,878

1 Claim. (Cl. 146—124)

The present invention relates to improvements in machines intended for disintegrating food-stuffs, preferably vegetable foodstuffs.

The object of the invention is to increase the capacity of such a machine to render it usable in the large kitchens of restaurants, hospitals and similar institutions as well as in canning factories or like foodstuff industries.

The machine according to the invention is substantially intended for cutting food stuffs into slices, strips, cubes or the like.

The main features of the machine are herein described in detail in the following description of an embodiment of the machine according to the invention, further possibilities for using the machines being apparent therefrom. In the description, reference is made to the accompanying drawings, in which:

Fig. 1 is a side view of the machine, partly in vertical section,

Fig. 2 is a perspective view of the same machine with its hopper swung down towards the side, Fig. 3 is a top plan view of the hopper with its propeller-shaped blades, below which is a rotatable disc with three knives.

Fig. 4 shows in plan view the lower half of a rotatable disc, provided with a single knife, and below the disc is a grille with square apertures for producing cubes.

Fig. 5 is a vertical section of the knife disc and the grille along the line V—V in Fig. 4.

The embodiment of the machine according to the invention represented in the drawing is provided with a frame in the form of a casing 1, which at the bottom is screwed on to a foundation 2. The upper portion of the casing 1 merges into a vertical cylindrical neck 3, in the centre of which is journalled by means of a bushing 4 a vertical spindle 5 journalled at its lower part in the foundation 2. The bottom end of the spindle 5 carries a double V belt pulley 6 connected via two V belts with a smaller V belt pulley 7, which is secured to the lower end of the downwardly projecting shaft of a vertically standing electric motor 8 enclosed in the casing 1. The motor 8 is controlled by means of a switch 9 provided on the outside of the middle portion of the casing.

Placed on the upper rim of the cylindrical neck 3 is a hopper 10, which expands in the upward direction and is coaxially centered relative the spindle 5. The lower rim of the hopper 10 is hinged on one side to the upper rim of the neck 3 by means of a hinge 11. On the opposite side, the hopper has a locking device with a handle 12. The hopper can be released by means of the handle 12 and be swung down on the hinge side, as shown in perspective in Fig. 2. Thereby the opening of the neck 3 is made free for the exchange of rotatable disintegrating members, which are placed on the upper spindle end.

The said disintegrating members may be varied in several ways. For cutting beets or the like vegetable material into slices, the disintegrating member is formed as a circular disc, on which one or more radially extending knives are detachably secured. In Figs. 1, 2 and 3 the spindle is provided with a detachable disc 13 of the kind described, equipped with three radial knives 14. Figs. 4 and 5 disclose a similar disc 15 having a single knife 16 for slicing the material, which is then forcibly fed downwardly by the wedging action of the inclined lower edge of the knife 16 and the adjacent similarly inclined edge of disc 15 through a grille 17 and thereby cut into cubes. In the centre of their top faces the circular discs described are provided with upwardly projecting, axial handles 23 for facilitating the exchange of the discs. The bottom face of the disc 15 is equipped with a nave with diametrically placed recesses 24, arranged to fit over corresponding, diametrically placed lugs 24' on the top side of a flange 25 (Fig. 5) on the top end of the spindle 5. This connection renders the discs easily detachable from the spindle, while at the same time they will rotate together with the same.

To feed down the material against the cutting discs, the hopper 10 is provided at the inner side of its lower edge with two diametrically disposed wings 26, which are downwardly curved and have lower edges extending across the bottom opening of the hopper, said wings being formed integrally with the walls of the hopper. The lower edges of the said wings are positioned immediately above the cutting member. Due to the inclined bottom faces 26' of the wings, the material is fed down effectively against the rotating disc equipped with cutting members. However, the curved formation of the feeding wings 26 is such as to provide a pocket in which food to be cut can be momentarily retained to reduce the rate of feed to within the cutting capacity of the cutters. The disintegrated material is discharged through the casing neck by means of an inclined face 27. A machine according to the invention provided with a cutting disc having a diameter of 20 centimeters can cut about three tons per hour of the material into slices, strips or the like.

When using the machine for cutting slices into cubes, a circular grille 17 is provided immediately beneath the cutting means, which is preferably shaped as a disc 15 (Figs. 6 and 7) with a single knife 16, said grille being carried by an annular shoulder 28 on the inside of the neck 3. The grille 17 consists of bars or bands 29, standing on edge and crossing each other at right angles. The grille bars or bands are sharp at their top edges and form square openings, through which the sliced material is fed by the downwards pressure from the rotating knife disc 15.

It will be understood that the invention is not confined to the embodiment described in the text and illustrated in the drawings but may be varied in many ways without a departure from the spirit and scope of the invention.

I claim:

A machine for cutting food, comprising a supporting structure including a casing, a vertical shaft mounted in said casing, a motor mounted in said casing, power transmitting means connecting said motor to drive said vertical shaft, an interchangeable cutting tool in the form of a disc having edged openings therein carried by the upper end portion of said vertical shaft so as to be driven rotably thereby, and an upwardly widening feeding hopper substantially horizontally hinged to said casing at a location above said cutting tool and concentric therewith, feeding members arranged within the lower portion of said hopper and being provided with bottom sides which are inclined downwardly in the direction of rotation of said cutting tool and have lower edges located adjacent to said cutting tool, said feeding members comprising two diametrically opposed, downwardly curved wings, said wings being integral with said feeding hopper and projecting downwardly towards the center of the hopper from the internal side of the wall of said feeding hopper in a direction which is substantially radial to the axis of said hinge of said hopper, thereby providing a free space between the opposed edges of the said wing blades, the curved shape of said wings providing pockets for containing food to be cut to reduce the feeding effect of said wings, and said cutting tool being equipped with an upwardly projecting central handle knob for facilitating exchange of said cutting tool, said handle knob being arranged to be received with said free space between the wing-blades when the hopper is in the working position.

References Cited in the file of this patent

UNITED STATES PATENTS

| | | |
|---|---|---|
| 1,017,586 | Petchuck | Feb. 13, 1912 |
| 1,190,275 | Ferris | July 11, 1916 |
| 1,371,865 | Cox | Mar. 15, 1921 |
| 1,382,449 | Andrysiak | June 21, 1921 |
| 1,580,273 | Zvorias | Apr. 13, 1926 |
| 1,638,416 | Smith et al. | Aug. 9, 1927 |
| 1,955,360 | Ferry | Apr. 17, 1934 |
| 2,284,155 | Landgraf | May 26, 1942 |
| 2,585,255 | Kochner et al. | Feb. 12, 1952 |